(12) United States Patent
Zhao et al.

(10) Patent No.: US 10,916,750 B2
(45) Date of Patent: Feb. 9, 2021

(54) POWER BATTERY PACK

(71) Applicant: BYD COMPANY LIMITED, Shenzhen (CN)

(72) Inventors: Jiyang Zhao, Shenzhen (CN); Qing Lai, Shenzhen (CN); Yanzi Ren, Shenzhen (CN); Jianhua Zhu, Shenzhen (CN); Yan Zhu, Shenzhen (CN)

(73) Assignee: BYD COMPANY LIMITED, Guangdon (CN)

( * ) Notice: Subject to any disclaimer, the term of this patent is extended or adjusted under 35 U.S.C. 154(b) by 37 days.

(21) Appl. No.: 16/335,186

(22) PCT Filed: Jun. 8, 2017

(86) PCT No.: PCT/CN2017/087568
§ 371 (c)(1),
(2) Date: Mar. 20, 2019

(87) PCT Pub. No.: WO2018/054100
PCT Pub. Date: Mar. 29, 2018

(65) Prior Publication Data
US 2019/0348652 A1    Nov. 14, 2019

(30) Foreign Application Priority Data

Sep. 21, 2016  (CN) .......................... 2016 1 0840579

(51) Int. Cl.
*H01M 4/02* (2006.01)
*H01M 2/10* (2006.01)
(Continued)

(52) U.S. Cl.
CPC ........... *H01M 2/1094* (2013.01); *H01M 2/12* (2013.01); *H01M 10/613* (2015.04); *H01M 10/6568* (2015.04)

(58) Field of Classification Search
CPC ...................................................... H01M 4/02
See application file for complete search history.

(56) References Cited

U.S. PATENT DOCUMENTS

2015/0188203 A1* 7/2015 Enomoto .......... H01M 10/5075
429/83

FOREIGN PATENT DOCUMENTS

CN    101728595 A    6/2010
CN    202217748 U    5/2012
(Continued)

OTHER PUBLICATIONS

PCT International Search Report and the Written Opinion dated Aug. 9, 2017, issued in related International Application No. PCT/CN2017/087568 (8 pages).
(Continued)

*Primary Examiner* — Jacob B Marks

(57) ABSTRACT

The present disclosure provides a power battery pack, including: a battery pack case, at least one battery module, and a return pipe. An oil inlet and an oil outlet are formed on the battery pack case, and insulation oil is charged from the oil inlet into the battery pack case. Each of the at least one battery module is disposed in the battery pack case, and each battery module includes a module case and at least one unit cell disposed in the module case. The unit cell is immersed in the insulation oil, and the bottom of the module case is provided with a through hole and the top of the module case is provided with at least one exhaust vent. The return pipe is disposed outside the battery pack case, and the return pipe is connected between the oil outlet and the oil inlet.

14 Claims, 15 Drawing Sheets

(51) Int. Cl.
    *H01M 10/613*     (2014.01)
    *H01M 10/6568*     (2014.01)
    *H01M 2/12*     (2006.01)

(56) References Cited

FOREIGN PATENT DOCUMENTS

| | | |
|---|---|---|
| CN | 202817141 U | 3/2013 |
| CN | 103682511 A | 3/2014 |
| CN | 204741054 U | 11/2015 |
| CN | 204947036 U | 1/2016 |
| CN | 206148572 U | 5/2017 |
| WO | 2014/013981 A1 | 1/2014 |

OTHER PUBLICATIONS

First Search dated Nov. 27, 2017, issued in related Chinese Application No. 201610840579.1 (1 page).
First Office Action dated Dec. 5, 2017, issued in related Chinese Application No. 201610840579.1 (13 pages), with English machine translation.

\* cited by examiner

POWER BATTERY PACK

CROSS-REFERENCE TO RELATED APPLICATIONS

This application is a national phase application of International Application No. PCT/CN2017/087568, filed on Jun. 8, 2017, which is based on and claims priority to and benefits of Chinese Patent Applications No. 201610840579.1, filed with the State Intellectual Property Office (SIPO) of the People's Republic China on Sep. 21, 2016. The entire contents of the above-identified applications are incorporated herein by reference.

FIELD

The present disclosure relates to the field of power battery technologies, and in particular, to a power battery pack.

BACKGROUND

In the related art, when a power battery pack is in a large-current charging/discharging process, a large quantity of heat is accumulated in a battery. If the heat is not controlled in time, a temperature of a battery module is sharply increased. Particularly, a large-capacity battery module has larger energy density and more dissipated heat, to easily cause thermal runaway. As a result, a battery has a problem such as gas release, smoking, or liquid leakage, and even the battery may burn, explode, or the like.

For a conventional power battery pack, an air cooling structure or a liquid cooling structure is usually used for performing undiversified thermal management on a unit cell in a battery module. However, the air cooling structure has low cooling efficiency, which cannot satisfy a safety requirement and a heat dissipation requirement of a battery group having large power, high energy density, and huge heat. The liquid cooling structure is a complex structure, and occupies large space, which is unfavorable to lightweight and compactness of the battery module.

SUMMARY

This application is made based on finding and understanding of the inventor on the following facts and problems: The inventor finds that, in the related art, after a liquid cooling power battery pack is used for a period of time, the service life and the charging/discharging rate of the power battery pack plummet. It is found through experimental analysis that, reasons why the service life and charging/discharging rate of the power battery pack plummet after a period of time of use are: the oil temperature is excessively high, and heat dissipation is not good.

The disclosure aims to resolve at least one of the technical problems existing in the prior art. To this end, an objective of the present disclosure is to propose a power battery pack. The power battery pack has a good heat dissipation effect.

The power battery pack according to the present disclosure includes: a battery pack case, where an oil inlet and an oil outlet are formed on the battery pack case, and insulation oil is charged from the oil inlet into the battery pack case; at least one battery module, where the at least one battery module is disposed in the battery pack case, each battery module includes a module case and at least one unit cell disposed in the module case, the at least one unit cell is immersed in the insulation oil, the bottom of the module case is provided with a through hole, and the top of the module case is provided with at least one exhaust vent; and a return pipe, where the return pipe is disposed outside the battery pack case, and the return pipe is connected between the oil outlet and the oil inlet.

In the power battery pack according to the present disclosure, the oil inlet and the oil outlet are disposed on the battery pack case, the return pipe is disposed between the oil inlet and the oil outlet, and the insulation oil may be injected into the battery pack case by using the oil inlet, so that the unit cell is immersed in the insulation oil. The return pipe may cause the insulation oil to return between the oil inlet and the oil outlet, to increase the heat dissipation area of the battery module, thereby improving the heat dissipation effect of the power battery pack, reducing the temperature of the power battery pack, and further improving the service life and the charging/discharging rate of the power battery pack. Moreover, immersion of the unit cell in the insulation oil may isolate the unit cell from air, thereby eliminating a spontaneous combustion risk of the battery module in an extreme case.

According to some embodiments of the present disclosure, the oil inlet is disposed adjacent to a bottom wall of the battery pack case, and the oil outlet is disposed on the top of the battery pack case.

According to some embodiments of the present disclosure, an oil return passage is formed between the return pipe and the battery pack case through the oil inlet and the oil outlet, and an oil pump is disposed on the oil return passage.

According to some embodiments of the present disclosure, the return pipe is a transparent pipe or a translucent pipe.

According to some embodiments of the present disclosure, a separator is disposed in the battery pack case, the separator separates the inner part of the battery pack case into first accommodation space and second accommodation space, and the at least one battery module is disposed in the second accommodation space.

According to some embodiments of the present disclosure, a sealing plate is disposed on the battery pack case, the sealing plate includes a first sealing plate and a second sealing plate, the first sealing plate is used to seal the first accommodation space, and the second sealing plate is used to seal the second accommodation space.

According to some embodiments of the present disclosure, the top of the second sealing plate is provided with at least one fixing member, a fixing hole is formed on the fixing member, and the return pipe passes through the fixing hole and is fixed on the second sealing plate.

According to some embodiments of the present disclosure, the battery pack case is further provided with a liquid cooling device, and the liquid cooling device is located on the bottom of the at least one battery module.

According to some embodiments of the present disclosure, the oil inlet is disposed adjacent to the liquid cooling device.

According to some embodiments of the present disclosure, the liquid cooling device includes a first main pipe, a second main pipe, and a plurality of liquid cooling members, both the first main pipe and the second main pipe extend along a first direction, the first main pipe has a liquid inlet and the second main pipe has a liquid outlet, the plurality of liquid cooling members is connected in parallel between the first main pipe and the second main pipe, and the plurality of liquid cooling members is used to cool the at least one battery module.

According to some embodiments of the present disclosure, the first main pipe and the second main pipe are arranged side by side and are both located on a same side of the at least one battery module along a second direction perpendicular to the first direction.

According to some embodiments of the present disclosure, a first end of each liquid cooling member and the first main pipe are connected by using a first adaptor pipe, and a second end of each liquid cooling member and the second main pipe are connected by using a second adaptor pipe.

According to some embodiments of the present disclosure, each of the first adaptor pipe and the second adaptor pipe is a bent pipe arranged along an up and down direction.

According to some embodiments of the present disclosure, each liquid cooling member includes a flat pipe extended from the bending.

According to some embodiments of the present disclosure, each liquid cooling member further includes a liquid cooling plate disposed on a side surface of the flat pipe adjacent to the at least one battery module.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The foregoing and/or additional aspects and advantages of this disclosure become obvious and easily understood in descriptions of the embodiments with reference to the following accompanying drawings.

Figure 1:
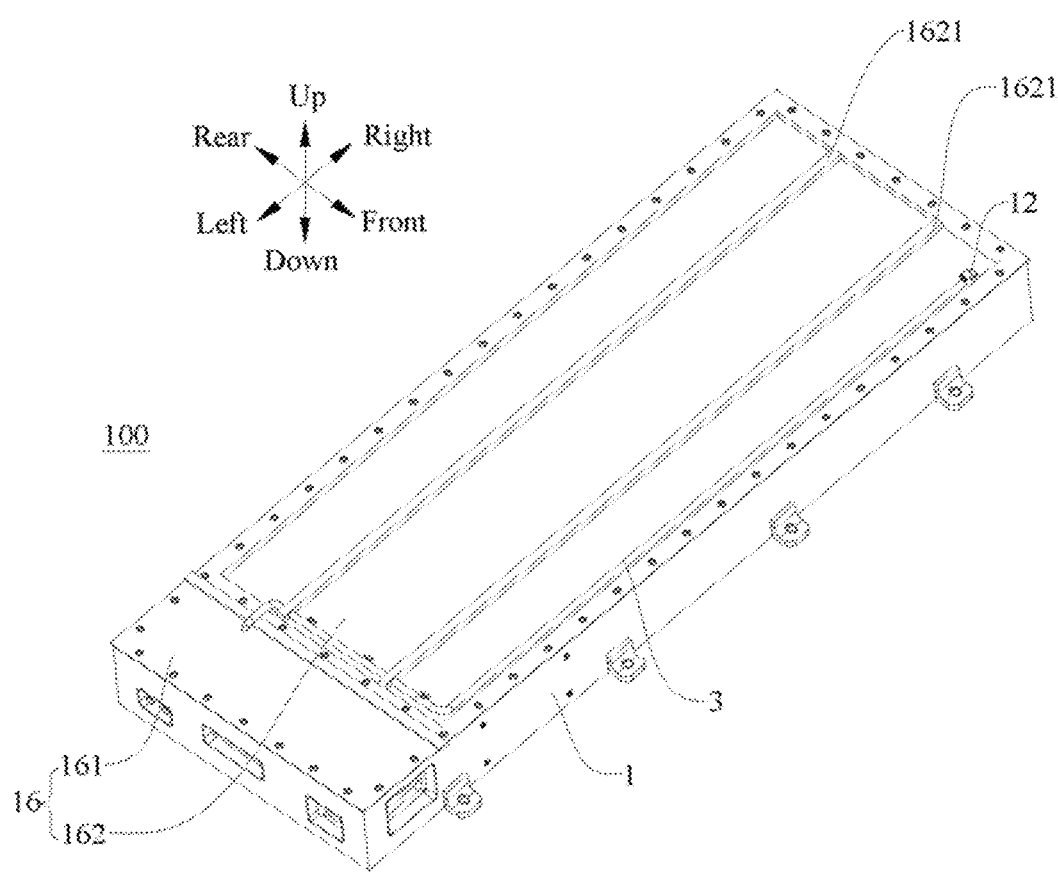
FIG. 1 is a three-dimensional view of a power battery pack according to an embodiment of the present disclosure.

REFERENCE NUMERALS OF THE ACCOMPANYING DRAWING power battery pack 100,
battery pack case 1, oil inlet 11, oil outlet 12, partition plate 13, cable leading-out slot 131, first accommodation space 14, second accommodation space 15, sealing plate 16, first sealing plate 161, second sealing plate 162, fixing member 1621,
battery module 2,
return pipe 3,
liquid cooling device 4, first main pipe 41, liquid inlet 411, second main pipe 42, liquid outlet 421, liquid cooling member 43, flat pipe 431, liquid cooling plate 432, first adaptor pipe 44, second adaptor pipe 45,
cable 51, seal ring 52, first seal ring 521, second seal ring 522, protrusion 523, seal groove 524, pressing plate 53, pressing plate seal washer 54, first pressing plate seal segment 541, pressing plate convex rib 5411, second pressing plate seal segment 542, leading-out slot seal washer 55, first leading-out slot seal segment 551, leading-out slot convex rib 5511, second leading-out slot seal segment 552, base plate 56, thread fixing member 57,
conductive post mounting body 61, conductive post 611, insulation member 612, seal member 613, third seal ring 6131, connection rib 6132, seal rib 6133, and pressing member 62.

DETAILED DESCRIPTION

The following describes embodiments of the disclosure in detail. Examples of the embodiments are shown in the accompanying drawings. The same or similar elements and the elements having same or similar functions are denoted by like reference numerals throughout the descriptions. The embodiments described below with reference to the accompanying drawings are exemplary, are used to only explain the disclosure, but cannot be understood as a limitation on the disclosure.

In descriptions of the present disclosure, it should be understood that, terms "first" and "second" are used only for description objectives, and shall not be construed as indicating or implying relative importance or implying a quantity of indicated technical features. Therefore, features modified by "first" and "second" may explicitly or implicitly include one or more features. In descriptions of this disclosure, "a plurality of" means two or more, unless otherwise stated.

In the descriptions of the present disclosure, it should be noted that, unless otherwise clearly specified and defined, terms such as "mounting", "interconnection", and "connection" shall be understood in a broad sense, for example, may be a fixing connection, a detachable connection, an integral connection, a mechanical connection, an electrical connection, a direct connection, an indirect connection by using an intermediate medium, and communication between interiors of two components. A person of ordinary skill in the art may understand specific meanings of the foregoing terms in this disclosure according to a specific situation.

A power battery pack 100 according to an embodiment of the present disclosure is described below with reference to FIG. 1 to FIG. 19.

Figure 2:
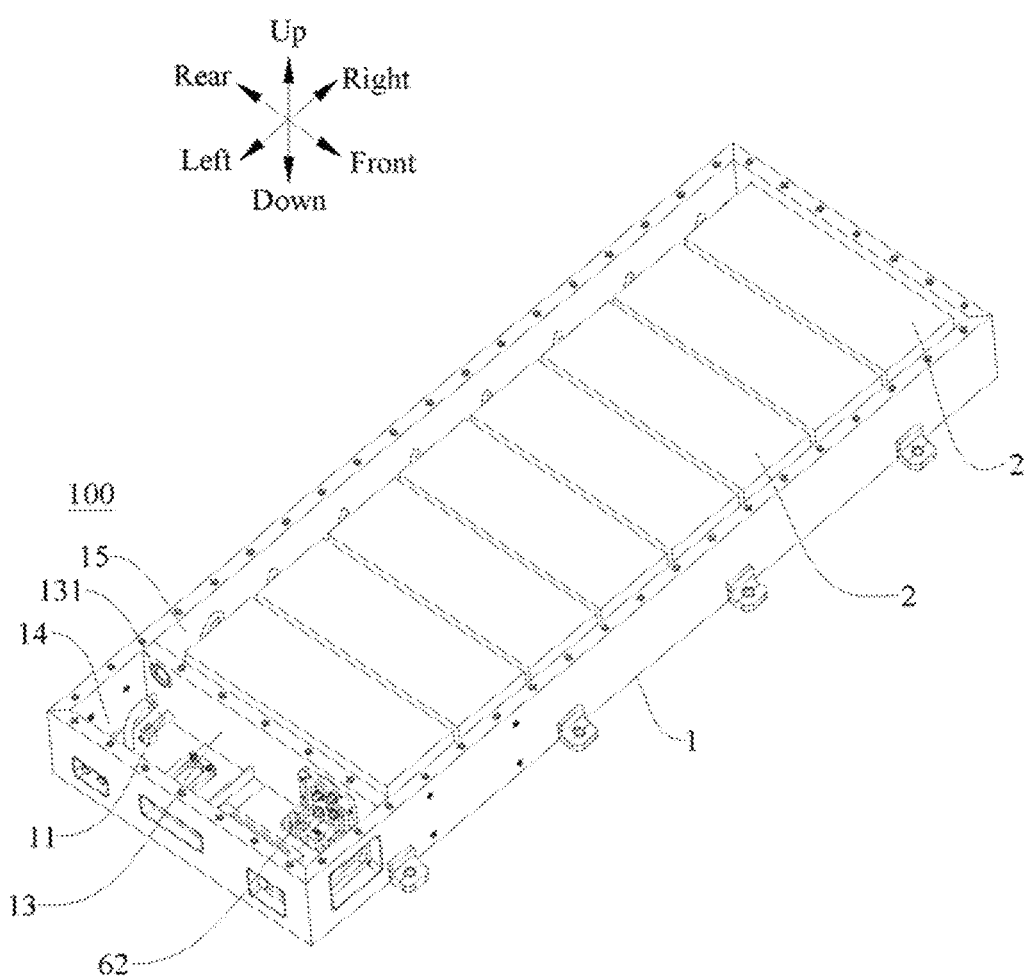
FIG. 2 is a three-dimensional view of a battery pack case, a battery module, and a liquid cooling device of a power battery pack according to an embodiment of the present disclosure.

As shown in FIG. 1 and FIG. 2, the power battery pack 100 according to this embodiment of the present disclosure includes: a battery pack case 1, a plurality of battery modules 2, and a return pipe 3.

Specifically, an oil inlet 11 is formed on the battery pack case 1, an oil outlet 12 is formed on an upper portion of the battery pack case 1, and insulation oil may be charged from the oil inlet 11 into the battery pack case 1. In some embodiments of the present disclosure, the oil inlet 11 may be formed into an inlet pipe, so as to charge the insulation oil into the battery pack case 1 by using the oil inlet 11.

Referring to FIG. 1, the return pipe 3 is disposed outside the battery pack case 1, and the return pipe 3 is connected between the oil outlet 12 and the oil inlet 11. Specifically, the return pipe 3 is disposed on the top of the battery pack case 1. Therefore, it is convenient for the insulation oil to return between the oil inlet 11 and the oil outlet 12, thereby facilitating dissipation of heat absorbed by the insulation oil and enabling the temperature of the insulation oil in the battery pack case 1 to be even, so as to improve the heat dissipation effect of the power battery pack 100.

Figure 3:
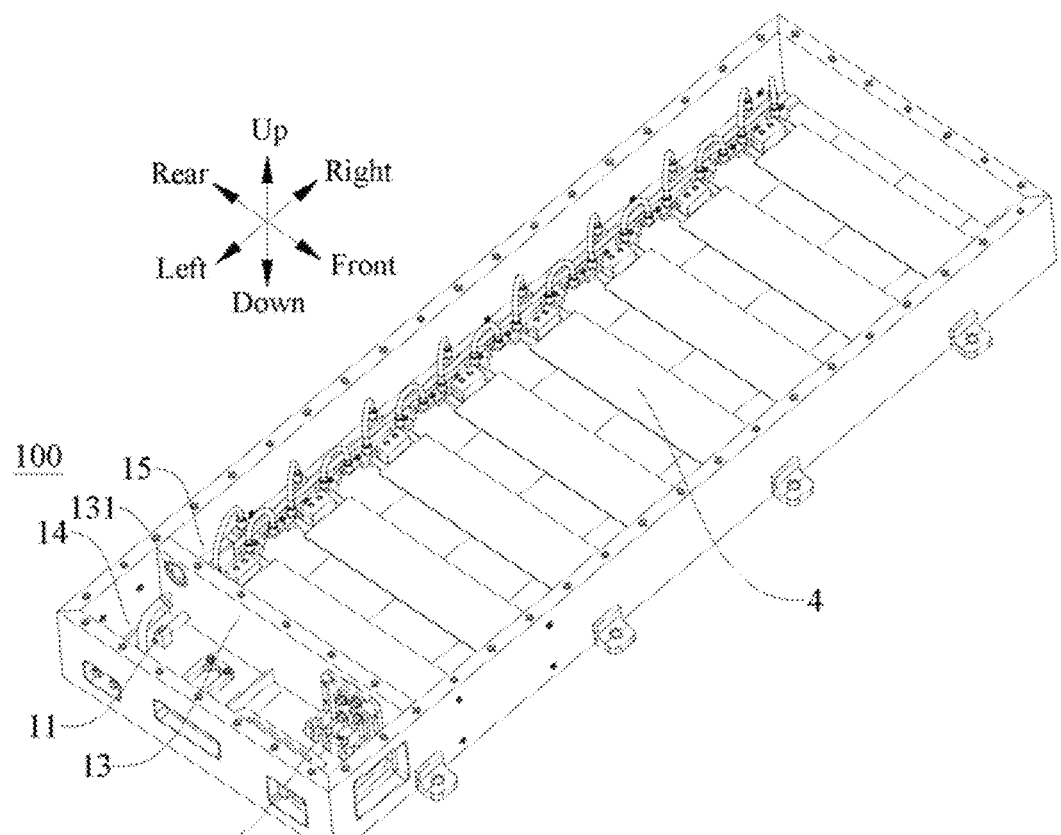
FIG. 3 is a three-dimensional view of a battery pack case and a liquid cooling device of a power battery pack according to an embodiment of the present disclosure.

In some embodiments of the present disclosure, the oil outlet 12 is located higher than the oil inlet 11. Referring to FIG. 2 and FIG. 3, the oil inlet 11 may be disposed adjacent to a bottom wall of the battery pack case 1. As shown in FIG. 1, the oil outlet 12 may be disposed on the top of the battery pack case 1. Therefore, the insulation oil may enter the battery pack case 1 (specifically, a second accommodation space 15, which is described in detail below) from the bottom of the battery pack case 1, thereby effectively reducing gas in the battery pack case 1, reducing air bubbles, and improving safety and reliability of the power battery pack 100.

At least one battery module 2 is disposed in the battery pack case 1. There may be one or more battery modules 2. For example, referring to FIG. 1 and with reference to FIG. 2 and FIG. 3, the battery pack case 1 may be formed into a rectangular shape, there is a plurality of battery modules 2, and the plurality of battery modules 2 may be arranged side by side in the battery pack case 1 along a first direction (for example, a left and right direction in FIG. 1).

Certainly, it may be understood that, the plurality of battery modules 2 may alternatively be disposed side by side along a second direction (for example, a front and rear direction in FIG. 1) perpendicular to the first direction. Or some battery modules 2 of the plurality of battery modules 2 may be disposed side by side along the first direction, and some other battery modules 2 of the plurality of battery modules 2 are disposed side by side along the second direction. In some embodiments of the present disclosure, the plurality of battery modules 2 may be disposed into one or more layers. When the plurality of battery modules 2 is disposed into a plurality of layers, the battery modules 2 may be stacked in an up and down direction. A specific arrangement manner of the battery modules 2 may be adjusted and designed according to an actual use occasion of the power battery pack 100. This is not specifically limited in the present disclosure.

Each battery module 2 includes a module case and at least one unit cell disposed in the module case, and the unit cell is immersed in the insulation oil. Therefore, the heat generated by the unit cell in a use process may be absorbed by using heat capacity of the insulation oil, to implement a heat buffering function, and perform cooling and heat dissipation on the battery module 2. Moreover, immersion of the unit cell in the insulation oil may enable temperatures of batteries of the power battery pack 100 to keep consistent and may enable the insulation oil to be in direct contact with an inner wall of the battery module 2, thereby increasing the heat dissipation surface of the battery module 2, effectively improving the heat dissipation effect, further improving the charging/discharging rate of the power battery pack 100, and prolonging the service life of the power battery pack 100.

Specifically, the bottom of the module case is provided with a through hole and the top is provided with at least one exhaust vent. The exhaust vent on the top of the module case may effectively assist in discharging gas in the module case, so that the insulation oil flows into the module case more easily, to increase the charging speed of the insulation oil. The through hole on the bottom of the module case may increase the charging speed of the insulation oil, so that the insulation oil is fully charged in the battery module 2 rapidly. In some embodiments of the present disclosure, the module case is a plastic member. Material costs of the plastic member are low and manufacturing is convenient.

Herein, it should be noted that, "at least one" mentioned in this application means one or more than one. Moreover, in the description of the present disclosure, directions or location relationships indicated by terms "center", "longitudinal", "landscape", "length", "width", "thickness", "upper", "lower", "front", "rear", "left", "right", "vertical", "horizontal", "top", "bottom", "inner", "outer", "axial", "radial", and "circumferential" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure.

In the power battery pack 100 according to this embodiment of the present disclosure, the oil inlet 11 and the oil outlet 12 are disposed on the battery pack case 1, and the return pipe 3 is disposed between the oil inlet 11 and the oil outlet 12. Therefore, the insulation oil may be injected into the battery pack case 1 by using the oil inlet 11, so that the unit cell is immersed in the insulation oil. The return pipe may enable the insulation oil to return between the oil inlet 11 and the oil outlet 12, to increase the heat dissipation area of the battery module 2, thereby improving the heat dissipation effect of the power battery pack 100, enabling the temperature of the insulation oil in the battery pack case 1 to be even, reducing the temperature of the power battery pack 100, and further improving the service life and the charging/discharging rate of the power battery pack 100. Moreover, immersion of the unit cell in the insulation oil may isolate the unit cell from air, thereby eliminating a spontaneous combustion risk of the battery module 2 in an extreme case.

According to some embodiments of the present disclosure, an oil return passage is formed between the return pipe 3 and the battery pack case 1 through the oil inlet 11 and the oil outlet 12, and an oil pump (not shown) is disposed on the oil return passage. Therefore, convection of the insulation oil in the battery pack case 1 may be implemented by using the oil pump, to accelerate heat dissipation of the power battery pack 100, thereby further improving the heat dissipation effect of the power battery pack 100. Moreover, the oil pump may control exhaust, to reduce gas in the insulation oil, thereby further reducing gas in the battery pack case 1, and improving safety and reliability of the power battery pack 100.

Further, a cooling device may be disposed in the return pipe 3 or the oil pump, and heat of the insulation oil is taken away by using the cooling device. Therefore, heat dissipation of the insulation oil may be further accelerated by using the cooling device, thereby improving the heat dissipation effect of the power battery pack 100, and prolonging the service life and the charging/discharging rate of the power battery pack 100.

According to some embodiments of the present disclosure, referring to FIG. 2 and FIG. 3, there is a separator 13 in the battery pack case 1, the separator 13 may extend along a width direction of the battery pack case 1 (for example, a front and rear direction in FIG. 2), and the separator 13 separates the inner part of the battery pack case 1 into first accommodation space 14 and second accommodation space 15. The plurality of battery modules 2 is disposed in the second accommodation space 15 of the battery pack case 1, and the oil inlet 11 may be disposed on the partition plate 13. For example, referring to FIG. 2 and FIG. 3, the oil inlet 11 is an inlet pipe, one end of the inlet pipe (for example, a right end in FIG. 2) is connected to the partition plate 13 and is linked with the second accommodation space 15, and another end of the inlet pipe (for example, a left end in FIG. 2) extends into the first accommodation space 14 away from the second accommodation space 15. Therefore, it is convenient to charge the insulation oil from the oil inlet 11 into the second accommodation space 15. The insulation oil is not charged into the first accommodation space 14, and the first accommodation space 14 may be used to place a component such as a control element. Therefore, deployment in the battery pack case 1 may be more ordered and compact.

Further, a sealing plate 16 is disposed on the battery pack case 1, and the sealing plate 16 includes a first sealing plate 161 and a second sealing plate 162. The first sealing plate 161 is used to seal the first accommodation space 14 of the battery pack case 1, and the second sealing plate 162 may be used to seal the second accommodation space 15 of the battery pack case 1. The first sealing plate 161 and the second sealing plate 162 may be fixed onto the battery pack case 1 by using a thread fixing member. Therefore, the sealing performance of the power battery pack 100 may be improved, thereby improving the protection level and the safety of the power battery pack 100, so that the protection level of the power battery pack 100 satisfies an IP67 requirement.

In some embodiments of the present disclosure, the return pipe 3 is a transparent pipe or a translucent pipe, but is not limited thereto. Therefore, it is convenient for a user to observe a charging situation of the insulation oil in the battery pack case 1 by using the return pipe 3, to prevent air bubbles from remaining in the insulation oil.

The return pipe 3 may be disposed above the second sealing plate 162, at least one fixing member 1621 may be disposed on the second sealing plate 162, a return pipe fixing hole is formed on the fixing member 1621, and the return pipe 3 passes through the return pipe fixing hole, so as to fasten the return pipe 3 onto the second sealing plate 162. Therefore, the structure is simple, mounting is convenient, and mounting stability of the return pipe 3 is effectively improved.

Specifically, there may be one or more fixing members 1621. For example, in the example in FIG. 1, there are two fixing members 1621, the two fixing members 1621 are spaced apart along a width direction of the second sealing plate 162 (for example, the front and rear direction in FIG. 1), and each fixing member 1621 may extend along a length direction of the second sealing plate 162 (for example, the left and right direction in FIG. 1).

In some embodiments of the present disclosure, the insulation oil may be insulation silicon oil or the like, but is not limited thereto. The insulation silicon oil is relatively good in cooling performance and insulation performance, and low in costs, thereby effectively improving the cooling effect and the insulation performance, and reducing the costs. Moreover, the insulation silicon oil has flame retardance, and may eliminate a spontaneous combustion risk of the battery module 2 in an extreme case, thereby further improving the protection level and the safety of the power battery pack 100.

According to some embodiments of the present disclosure, referring to FIG. 3, a liquid cooling device 4 is further disposed in the battery pack case 1, and the liquid cooling device 4 is located on the bottom of the battery module 2. Therefore, the temperature of the insulation oil may be effectively reduced by using the liquid cooling device 4, thereby further improving the heat dissipation effect of the power battery pack 100.

Specifically, in an operating process of the power battery pack 100, heat generated by the battery module 2 is transferred to the insulation oil, the liquid cooling device 4 on the bottom of the battery module 2 may reduce the temperature of the insulation oil on the lower portion of the battery pack case 1, and the insulation oil whose temperature is relatively high and that is on the upper portion of the battery pack case 1 returns to the oil inlet 11 by using the return pipe 3, enters the battery pack case 1 from the oil inlet 11, and performs cooling by using the liquid cooling device 4. Therefore, heat dissipation of the insulation oil may be accelerated, so that the temperature of the insulation oil in the battery pack case 1 is even, thereby improving the heat dissipation effect of the power battery pack 100, and prolonging the service life and the charging/discharging rate of the power battery pack 100.

Specifically, referring to FIG. 4 to FIG. 11, the liquid cooling device 4 includes a first main pipe 41, a second main pipe 42, and a plurality of liquid cooling members 43. Both the first main pipe 41 and the second main pipe 42 extend along a first direction (for example, a left and right direction in FIG. 4), the first main pipe 41 has a liquid inlet 411, and the second main pipe 42 has a liquid outlet 421. The plurality of liquid cooling members 43 is connected in parallel between the first main pipe 41 and the second main pipe 42, and the plurality of liquid cooling members 43 is used to cool at least one of the plurality of battery modules 2. Therefore, the plurality of liquid cooling members 43 is connected in parallel between the first main pipe 41 and the second main pipe 42, so that each liquid cooling member 43 may cool a battery module 2 corresponding to the liquid cooling member, and lower-level cooling is not affected by upper-level cooling (that is, a cooling effect of a lower-level liquid cooling member 43 and a cooling effect of an upper-level liquid cooling member 43 do not affect each other), to ensure that cooling effects of the liquid cooling members 43 are the same, and improve the cooling effect of the liquid cooling device 4, thereby improving the heat dissipation effect of the power battery pack 100, and reducing the temperature of the power battery pack 100.

According to a specific embodiment of the present disclosure, the plurality of liquid cooling members 43 and the plurality of battery modules 2 are in a one-to-one correspondence. To be specific, the quantity of liquid cooling members 43 and the quantity of battery modules 2 are the same, and each liquid cooling member 43 may cool a battery module 2 corresponding to the liquid cooling member. Therefore, the heat dissipation effect of the power battery pack 100 may be further improved, to reduce the temperature of the power battery pack 100.

Figure 4:
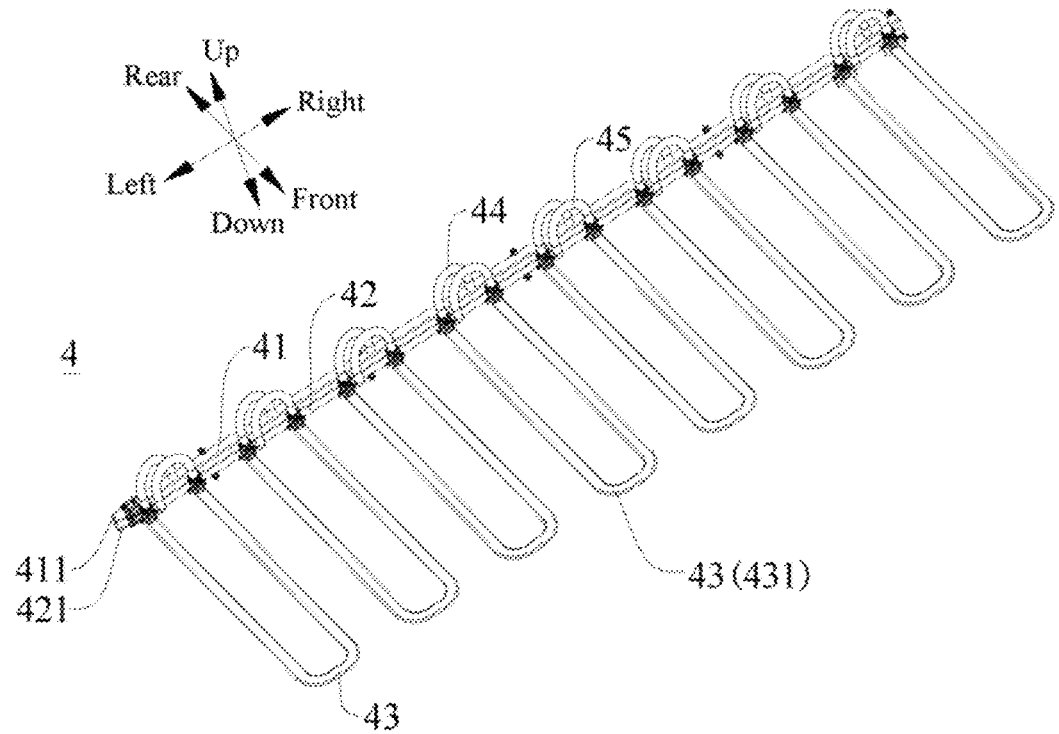
FIG. 4 is a three-dimensional view of a liquid cooling device according to an embodiment of the present disclosure.
Figure 5:
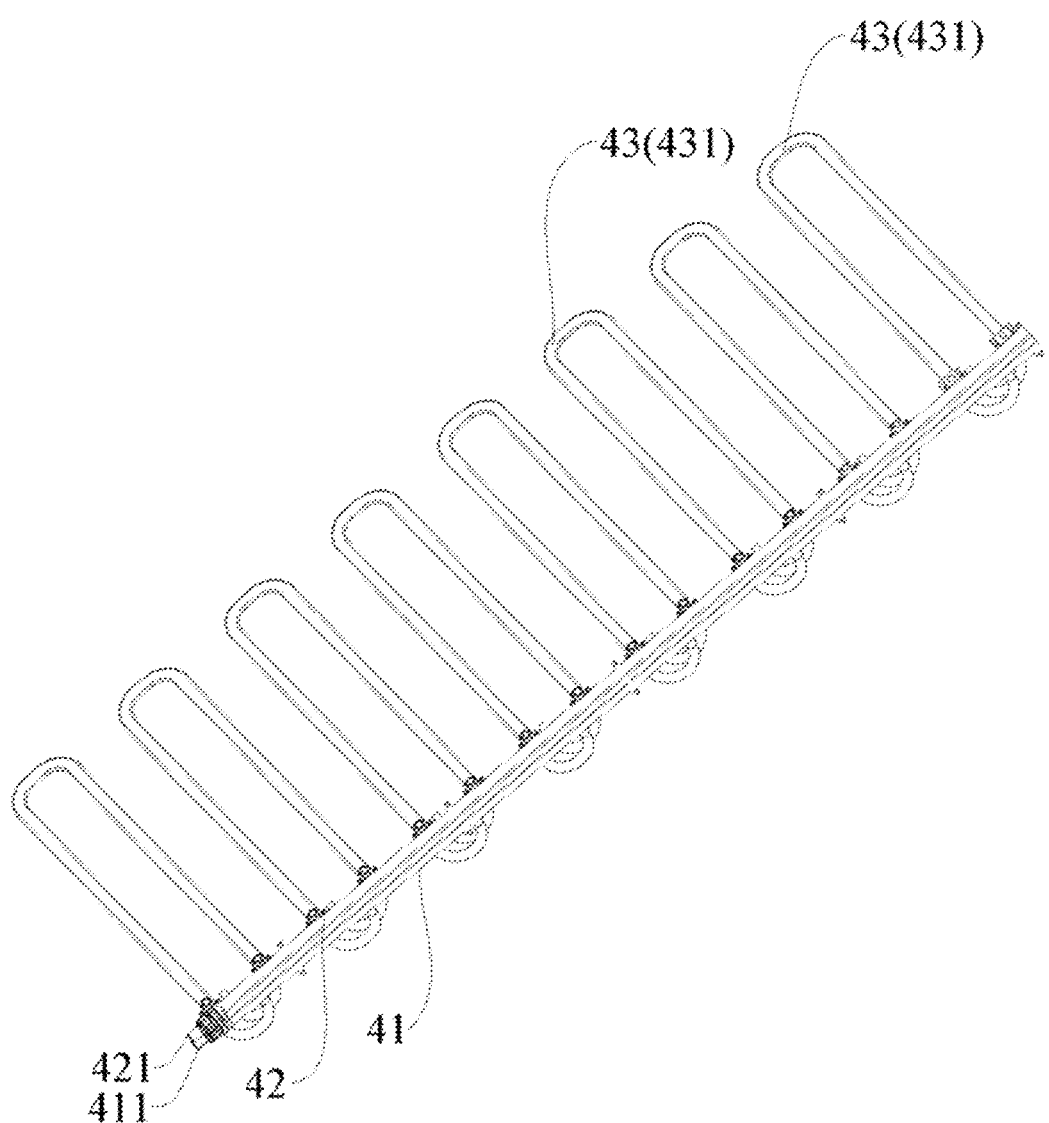
FIG. 5 is another three-dimensional view of a liquid cooling device according to an embodiment of the present disclosure.
Figure 6:
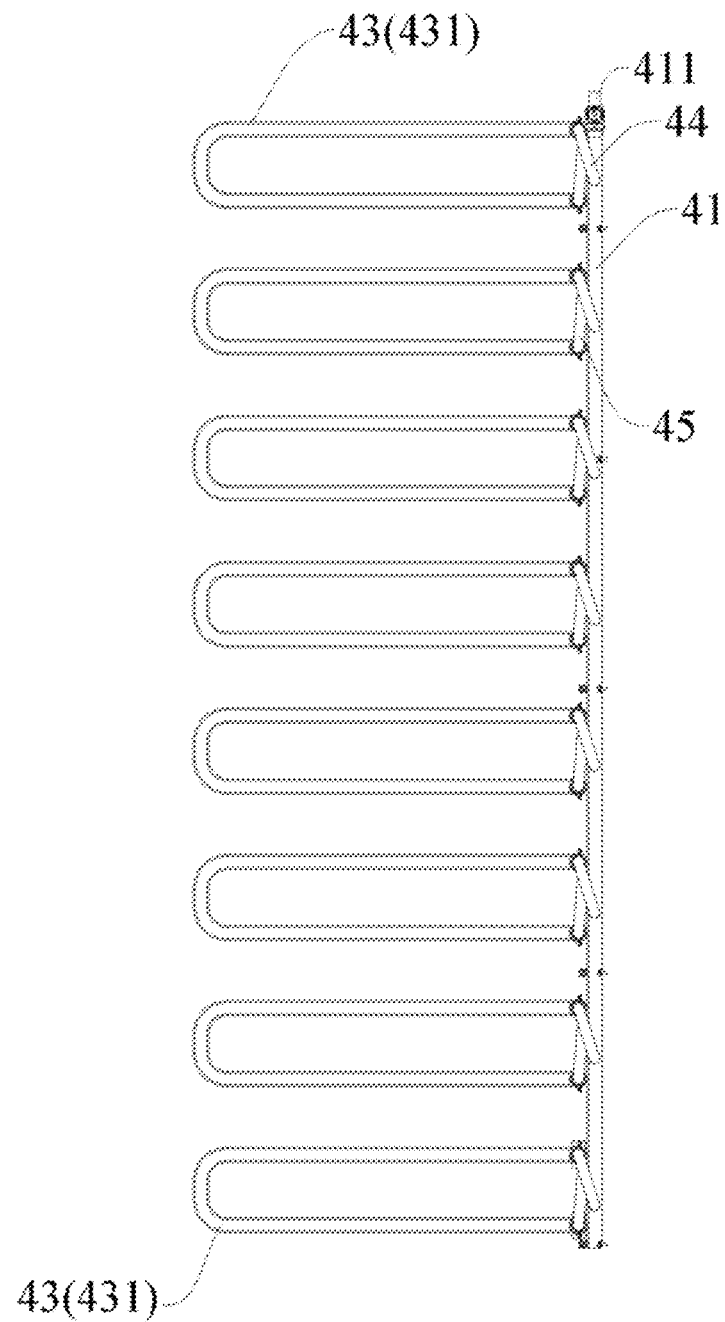
FIG. 6 is a top view of a liquid cooling device according to an embodiment of the present disclosure.
Figure 7:
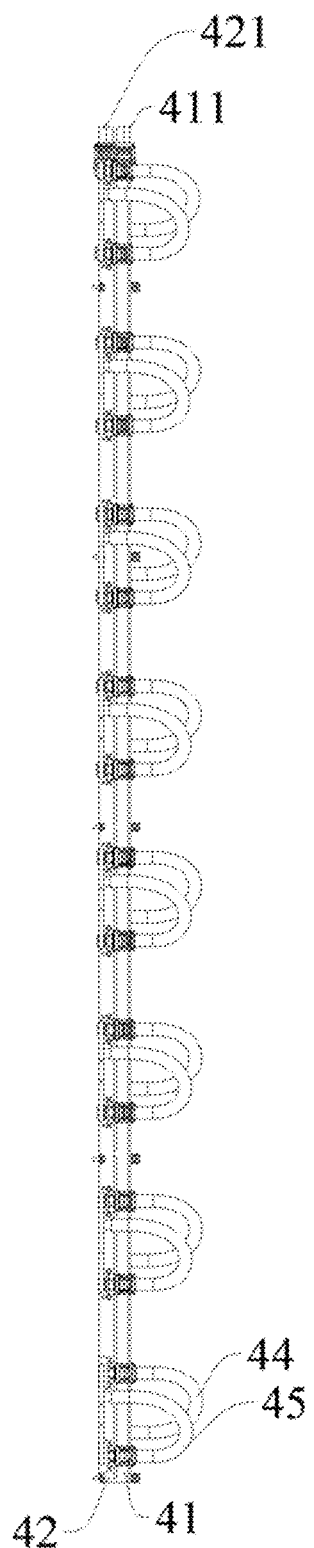
FIG. 7 is a rear view of a liquid cooling device according to an embodiment of the present disclosure.
Figure 8:
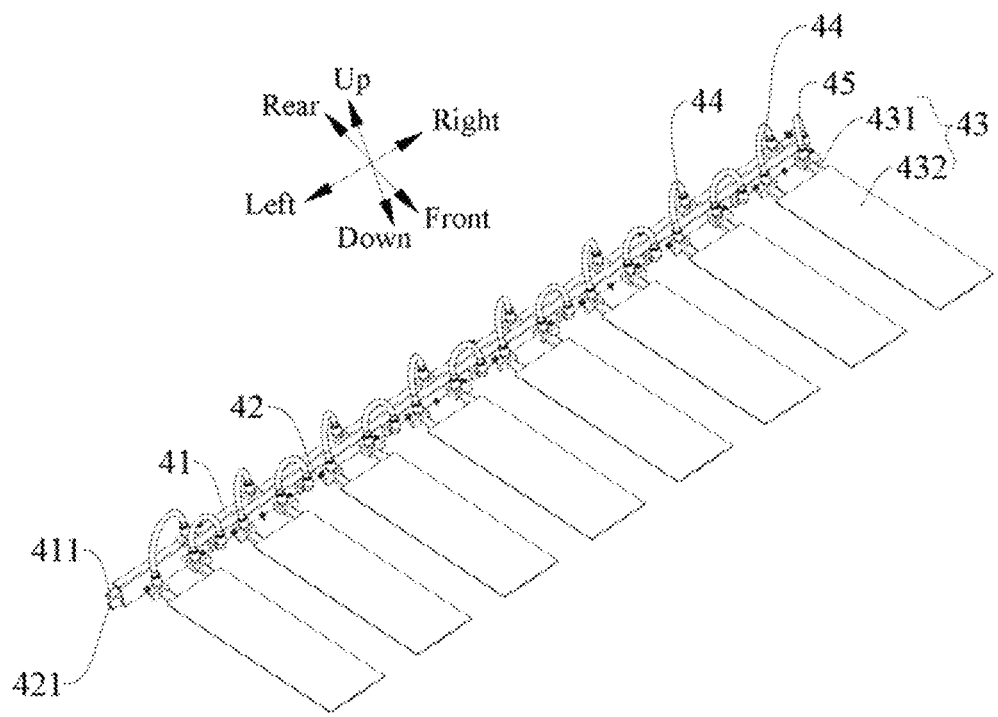
FIG. 8 is a three-dimensional view of a liquid cooling device according to another embodiment of the present disclosure.
Figure 9:
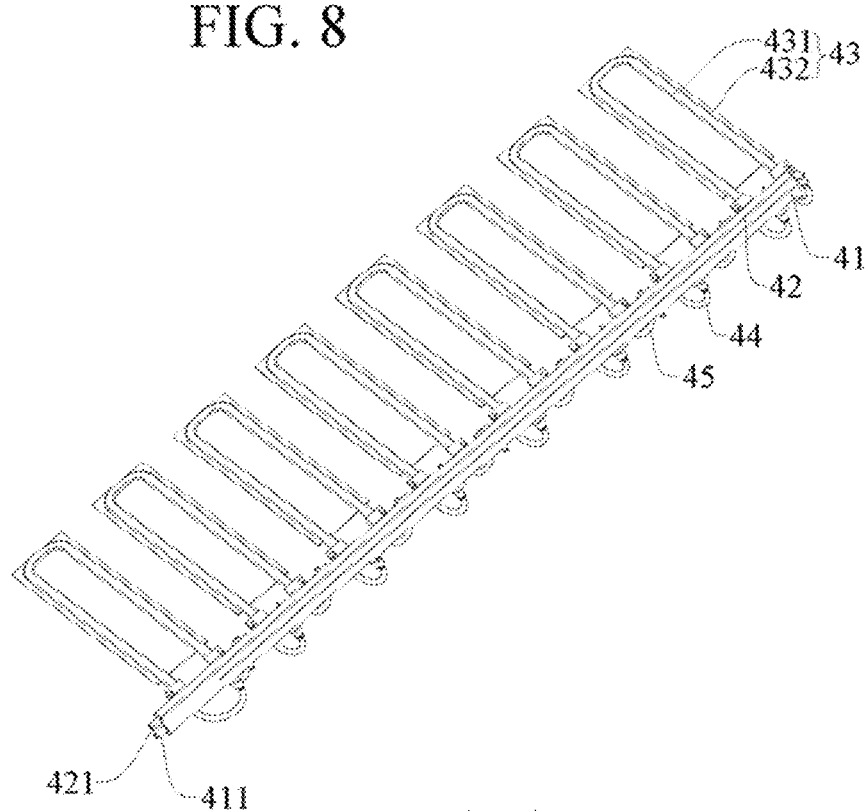
FIG. 9 is another three-dimensional view of a liquid cooling device according to another embodiment of the present disclosure.
Figure 10:
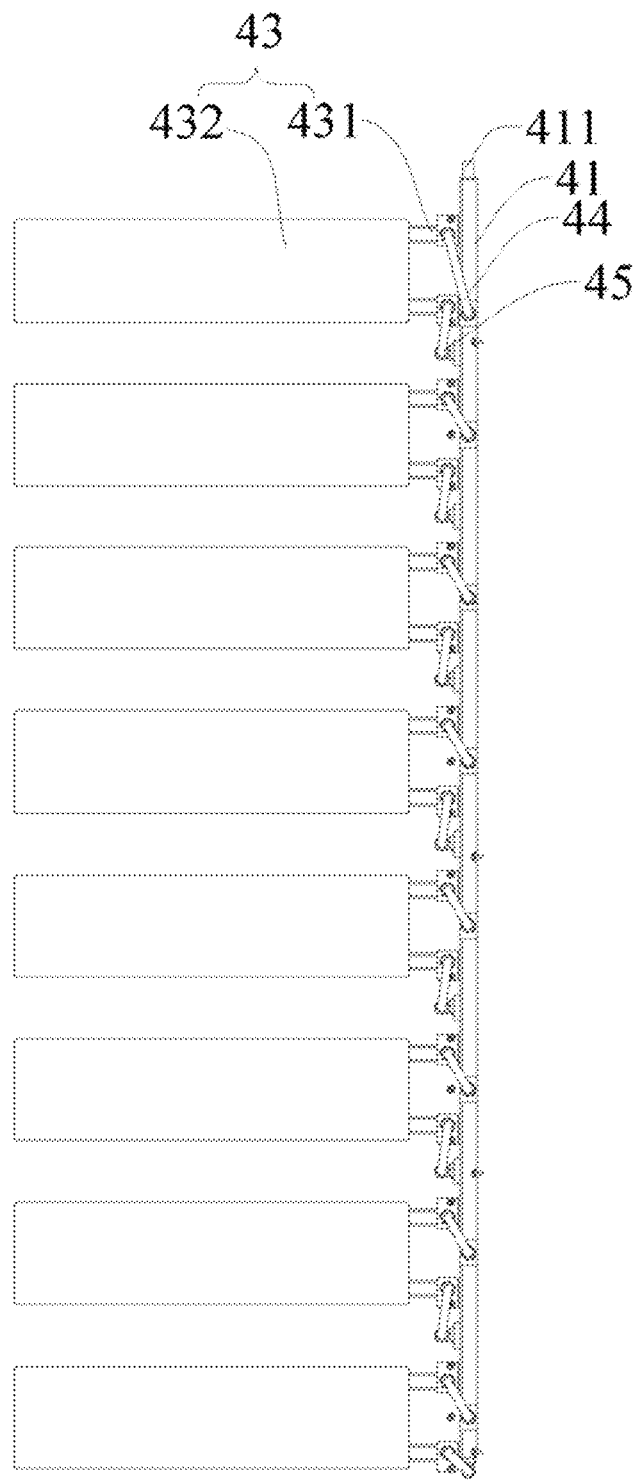
FIG. 10 is a top view of a liquid cooling device according to another embodiment of the present disclosure.
Figure 11:
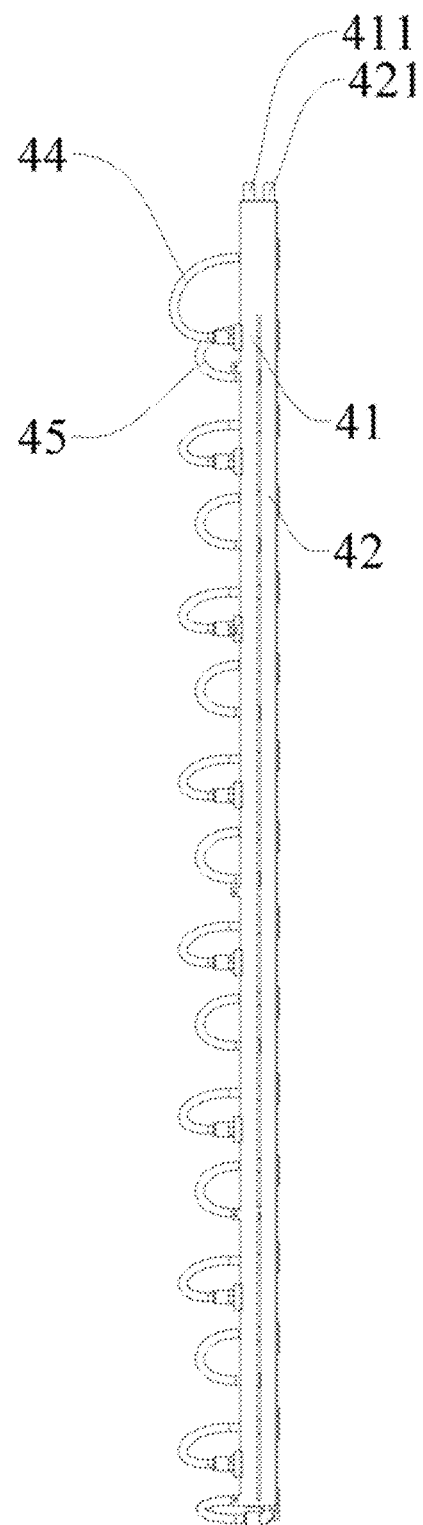
FIG. 11 is a rear view of a liquid cooling device according to another embodiment of the present disclosure.

Specifically, referring to FIG. 4, the liquid inlet 411 is formed at one end of the first main pipe 41 (for example, a left end in FIG. 4), and the liquid outlet 421 is formed at one end of the second main pipe 42 (for example, the left end in FIG. 4). The liquid cooling member 43 has a first end and a second end, the first end of the liquid cooling member 43 (for example, the left end in FIG. 4) may be connected to the first main pipe 41, and the second end of the liquid cooling member 43 (for example, a right end in FIG. 4) may be connected to the second main pipe 42. Cooling liquid may enter the first end of the liquid cooling member 43 from the liquid inlet 411 of the first main pipe 41. The cooling liquid flows in the liquid cooling member 43, then flows into the second main pipe 42 from the second end of the liquid cooling member 43, and finally flows out from the liquid outlet 421 of the second main pipe 42, to complete a cooling cycle.

According to some embodiments of the present disclosure, the first main pipe 41 and the second main pipe 42 are arranged side by side and are both located on a same side of the plurality of battery modules 2 along the second direction. The second direction is perpendicular to the first direction, the first direction may be the left and right direction in FIG. 4, and the second direction may be a front and rear direction in FIG. 4. For example, in the example in FIG. 4, the first main pipe 41 and the second main pipe 42 are disposed side by side in the up and down direction, the first main pipe 41 is located above the second main pipe 42, and the first main pipe 41 and the second main pipe 42 are both located on a rear side of the plurality of battery modules 2. Therefore, the structure of the liquid cooling device 4 may be made more compact, to reduce occupied space of the liquid cooling device 4.

Specifically, a first end of each liquid cooling member 43 and the first main pipe 41 are connected by using a first adaptor pipe 44, and a second end of each liquid cooling member 43 and the second main pipe 42 are connected by using a second adaptor pipe 45. Each of the first adaptor pipe 44 and the second adaptor pipe 45 is a bent pipe arranged along an up and down direction. Therefore, the liquid cooling member 43 may be conveniently connected between the first main pipe 41 and the second main pipe 42 by using the first adaptor pipe 44 and the second adaptor pipe 45, the structure is simple, and mounting is convenient.

Referring to FIG. 4, FIG. 7, FIG. 8, and FIG. 11, the first adaptor pipe 44 and the second adaptor pipe 45 may be substantially formed into U-shaped pipes. The first adaptor pipe 44 and the second adaptor pipe 45 may be formed into circular pipes, that is, the cross section of each of the first adaptor pipe 44 and the second adaptor pipe 45 is circular. A first end of the first adaptor pipe 44 (for example, the left end in FIG. 4) may be connected to the first end of the liquid cooling member 43, and a second end of the first adaptor pipe 44 (for example, the right end in FIG. 4) may be connected to the first main pipe 41. A first end of the second adaptor pipe 45 (for example, the left end in FIG. 4) may be connected to the second main pipe 42, and a second end of the second adaptor pipe 45 (for example, the right end in FIG. 4) may be connected to the second end of the liquid cooling member 43. Therefore, the liquid cooling member 43 may be conveniently connected between the first main pipe 41 and the second main pipe 42 by using the first adaptor pipe 44 and the second adaptor pipe 45, to simplify the mounting process, improve the mounting efficiency, and effectively reduce flowing resistance of the cooling liquid, thereby reducing load on a driving pump for driving the cooling liquid to flow, and reducing the use costs of the power battery pack 100.

According to some embodiments of the present disclosure, referring to FIG. 8 to FIG. 11, each liquid cooling member 43 includes a flat pipe 431 extended from the bending. For example, the liquid cooling member 43 may be formed by bending a circular pipe according to an arrangement situation of the unit cell or the battery module 2, so that the circular pipe is formed into a shape matching the battery module 2, and then the bent circular pipe is flattened to form the flat pipe 431. Therefore, the cooling effect of the liquid cooling member 43 may be ensured, the occupied space of the liquid cooling member 43 may be reduced, the structure is simple, and the manufacturing is convenient.

In some embodiments of the present disclosure, the flat pipe 431 may be bent into an M shape, a U shape, or an S shape, but is not limited thereto, as long as the bent shape of the flat pipe 431 matches the battery module 2. This is not specifically limited in the present disclosure.

Further, each liquid cooling member 43 further includes a liquid cooling plate 432 disposed on a surface of the flat pipe 431 adjacent to the battery module 2. Referring to FIG. 2 and with reference to FIG. 3, the plurality of liquid cooling members 43 is respectively disposed on the bottoms of the plurality of battery modules 2. Referring to FIG. 8 to FIG. 11, the liquid cooling plate 432 is disposed on an upper surface of the flat pipe 431. Specifically, the liquid cooling plate 432 may be formed into a rectangular flat plate structure. Therefore, the contact area between the liquid cooling member 43 and the battery module 2 may be effectively increased, thereby increasing the heat dissipation area, improving the heat dissipation effect, reducing the temperature of the battery module 2, improving the charging/discharging rate of the power battery pack 100, and prolonging the service life of the power battery pack 100.

According to some other embodiments of the present disclosure, each liquid cooling member 43 may alternatively be formed into a flat plate shape, and a liquid cooling flow passage whose two ends are respectively linked with the first main pipe 41 and the second main pipe 42 is defined in each liquid cooling member 43. Therefore, the contact area between the liquid cooling member 43 and the battery module 2 may be effectively increased similarly, thereby increasing the heat dissipation area, and improving the heat dissipation effect of the power battery pack 100.

Certainly, it may be understood that, in some embodiments of the present disclosure, each liquid cooling member 43 may alternatively include only the flat pipe 431 (as shown in FIG. 4 to FIG. 7). Therefore, the battery module 2 may be cooled similarly by using the liquid cooling member 43.

Specifically, the plurality of liquid cooling members 43 is respectively disposed on the bottoms of the plurality of battery modules 2. Therefore, heat dissipation of the battery module 2 may be ensured, mounting is convenient, and occupied space is small.

Figure 12:
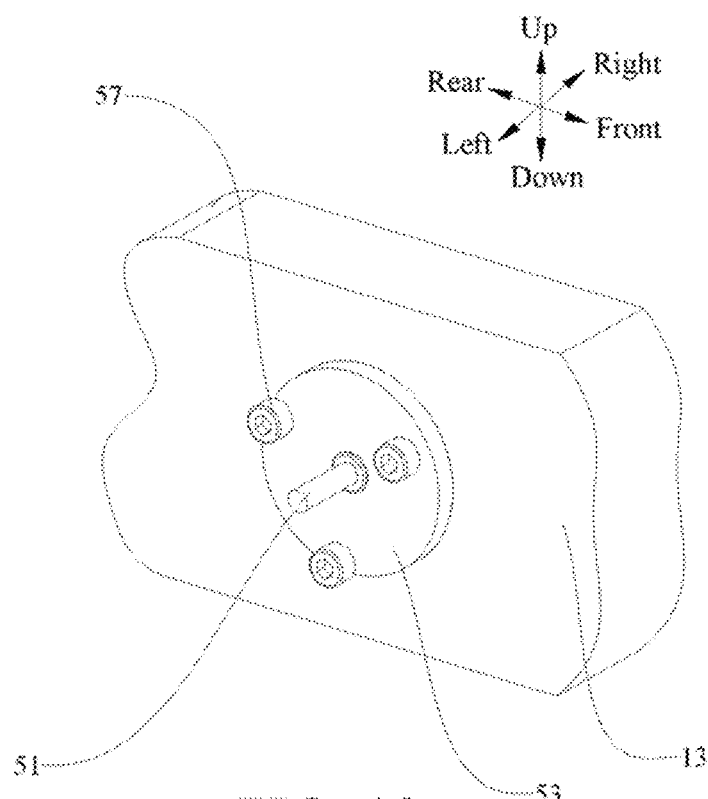
FIG. 12 is a partial schematic diagram of a power battery pack according to an embodiment of the present disclosure, showing a pressing plate cooperating in a cable leading-out slot and a cable passing through the cable leading-out slot.
Figure 14:
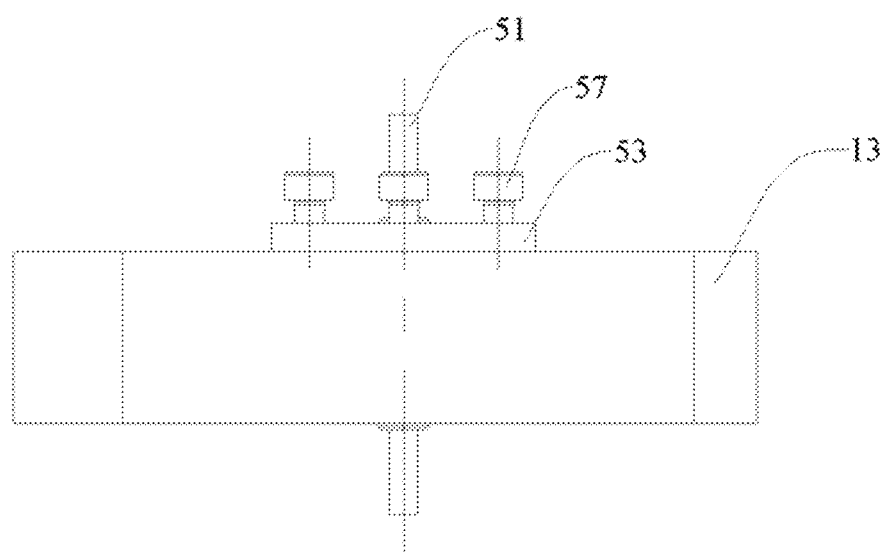
FIG. 14 is a partial bottom view of the power battery pack shown in FIG. 12.
Figure 15:
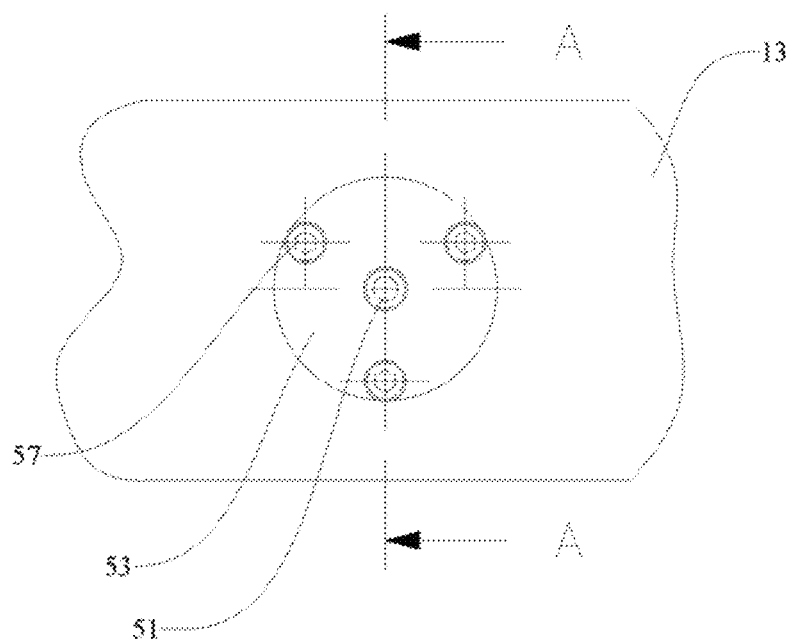
FIG. 15 is a partial front view of the power battery pack shown in FIG. 12.
Figure 16:
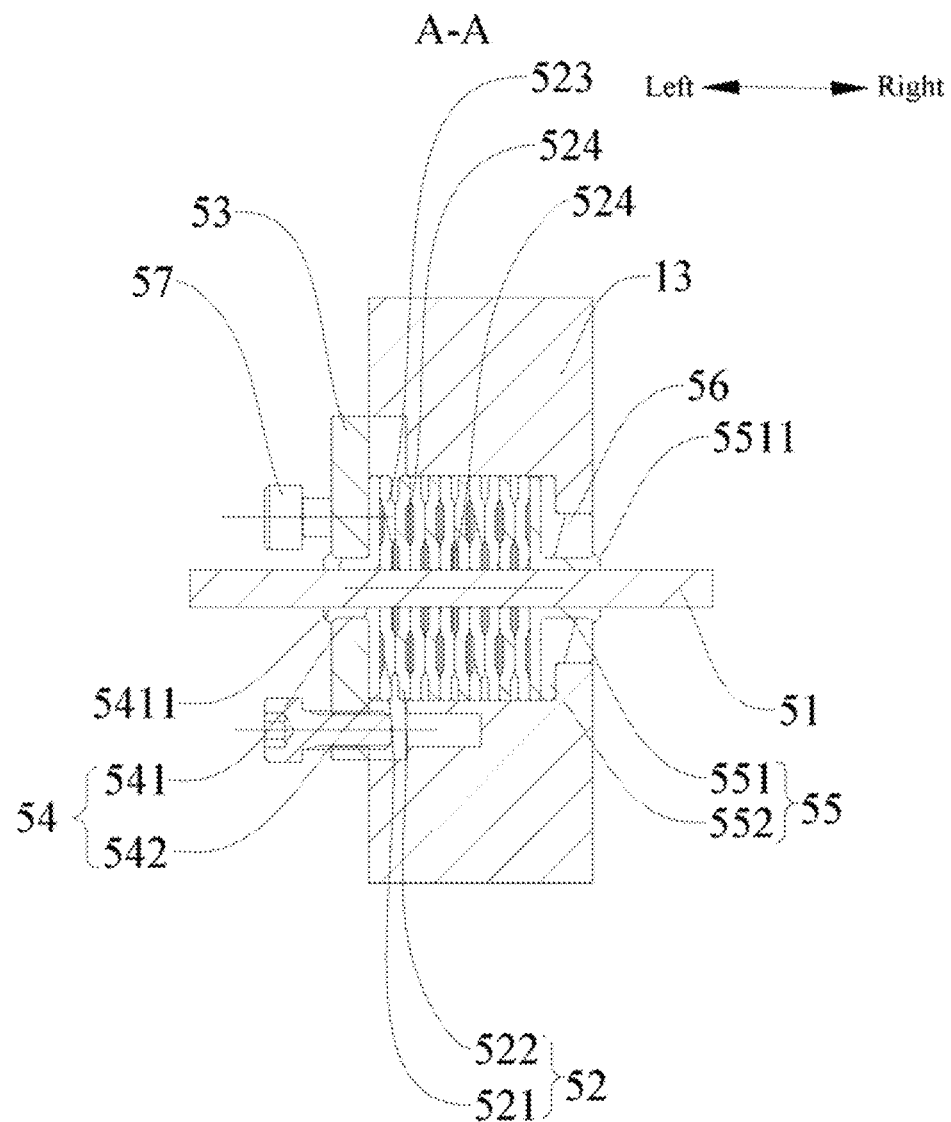
FIG. 16 is a sectional view along a line A-A in FIG. 15.

Referring to FIG. 2 and FIG. 3 and with reference to FIG. 12, FIG. 14, and FIG. 16, according to some embodiments of the present disclosure, a cable leading-out slot 131 is formed on the battery pack case 1, and the power battery pack 100 further includes a cable 51, a plurality of seal rings 52, and a pressing plate 53. The cable 51 may be a signal cable of the power battery pack 100 or the battery module 2.

Specifically, referring to FIG. 2 and FIG. 12, the cable leading-out slot 131 may be formed on the partition plate 13, a first end of the cable 51 (for example, a right end in FIG. 12) is disposed in the second accommodation space 15, and a second end of the cable 51 (for example, a left end in FIG. 12) passes through the cable leading-out slot 131 and extends beyond the second accommodation space 15. The section of the cable leading-out slot 131 may be a circle, but is not limited thereto. The cable 51 may be led out from the center of the cable leading-out slot 131. Therefore, the cable 51 may be conveniently led out.

Figure 13:
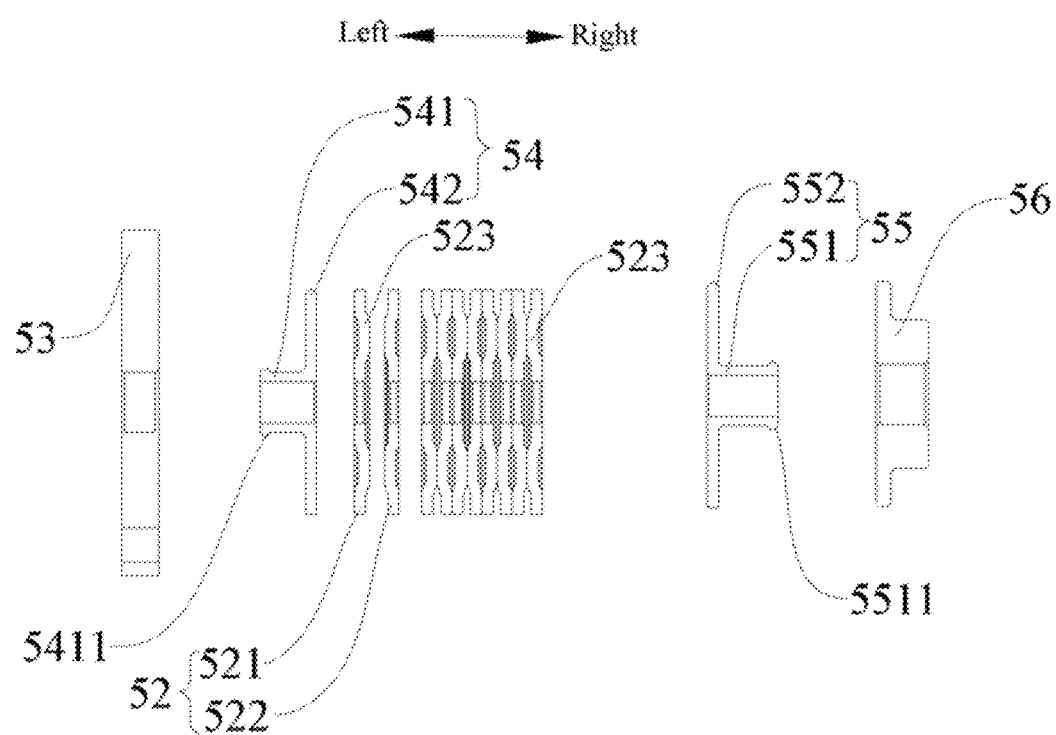
FIG. 13 is an exploded view of a seal ring, a pressing plate, a pressing plate seal washer, a leading-out slot seal washer, and a base plate according to an embodiment of the present disclosure.

Referring to FIG. 13 and FIG. 16, the plurality of seal rings 52 is sleeved on the cable 51 and is located in the cable leading-out slot 131, a protrusion 523 is disposed on each seal ring 52, and the protrusion 523 is formed by a part of the seal ring 52 protruding from a side surface of the seal ring 52 to another side surface of the seal ring 52. The cable 51 passes through the pressing plate 53, and the pressing plate 53 tightly presses the plurality of seal rings 52 in the cable leading-out slot 131 to seal a gap between an outer circumferential edge of the seal ring 52 and an inner circumferential wall of the cable leading-out slot 131 and seal a gap between an inner circumferential edge of the seal ring 52 and the cable 51. Therefore, the sealing performance of the cable leading-out slot 131 may be improved, to prevent the insulation oil from leaking from the cable leading-out slot 131.

The protrusion 523 may be formed by a part of the seal ring 52 protruding from a left side surface of the seal ring 52 to a right side surface of the seal ring 52, or be formed by a part of the seal ring 52 protruding from a right side surface of the seal ring 52 to a left side surface of the seal ring 52. There may be one or more protrusions 523 on each seal ring 52.

The section of the seal ring 52 may be a circle, and the center of the seal ring 52 is provided with a cable threading hole, so that the plurality of seal rings 52 is threaded by the cable 51, thereby improving the sealing performance of the cable leading-out slot 131. The pressing plate 53 may be formed into a flat plate structure matching the section of the cable leading-out slot 131, for example, a circular flat plate structure. An inner hole is formed in the center of the pressing plate 53, and the cable 51 may pass through from the inner hole of the pressing plate 53. Therefore, it is convenient for the pressing plate 53 to tightly press the plurality of seal rings 52 in the cable leading-out slot 131 to seal the gap between the outer circumferential edge of the seal ring 52 and the inner circumferential wall of the cable leading-out slot 131 and seal the gap between the inner circumferential edge of the seal ring 52 and the cable 51. Therefore, the cable of the battery module 2 or the power battery pack 100 may be conveniently led out and the sealing performance is good.

The outer circumferential edge of the seal ring 52 is an end surface on a radial outer side of the seal ring 52, and the inner circumferential edge of the seal ring 52 is an inner circumferential wall of the cable threading hole.

According to some embodiments of the present disclosure, the seal rings 52 include: a plurality of first seal rings 521 and a plurality of second seal rings 522, the plurality of first seal rings 521 and the plurality of second seal rings 522 are staggered along an axial direction of the cable 51 (for example, a left and right direction in FIG. 16), and protrusions 523 of the first seal rings 521 and protrusions 523 of the second seal rings 522 are opposite to each other. For example, referring to FIG. 16, in a direction from left to right, the first seal rings 521 and the second seal rings 522 may be arranged in an order of a first seal ring 521, a second seal ring 522, a first seal ring 521, a second seal ring 522, and so on. A protrusion 523 of a first seal ring 521 (for example, a seal ring 52 on the leftmost side in FIG. 16) and a protrusion 523 of a second seal ring 522 (for example, a left second seal ring 52 in FIG. 16) adjacent to the first seal ring are opposite to each other. The protrusion 523 of the first seal ring 521 and the protrusion 523 of the second seal ring 522 define a seal groove 524, and the seal groove 524 is located on a radial inner side of the seal ring 52 relative to the protrusion 523. Another seal groove 524 is defined between the protrusion 523 of the second seal ring 522 and a protrusion 523 of another first seal ring 521 (for example, a left third seal ring 52 in FIG. 16) adjacent to the second seal ring.

For example, in a process in which the pressing plate 53 tightly presses the seal ring 52, after being pressed, a part of the protrusion 523 of the first seal ring 521 and a part of the protrusion 523 of the second seal ring 522 respectively stretch along radial directions of the first seal ring 521 and the second seal ring 522, so that the inner circumferential edge of the seal ring 52 is in contact with the outer circumferential surface of the cable 51 and the outer circumferential edge of the seal ring 52 is in contact with the inner circumferential wall of the cable leading-out slot 131, thereby implementing sealing. Moreover, in a stretching process of the protrusion 523, some residual air stays in the seal groove 524, and the staying of the air in the seal groove 524 may keep seal elasticity of the seal ring 52 and also form gas seal. Therefore, the seal effect of the seal ring 52 is effectively improved.

In some embodiments of the present disclosure, the protrusion 523 may be formed into an annular protrusion 523 extending along a circumferential direction of the cable 51. The structure is simple, and the manufacturing is convenient.

According to some embodiments of the present disclosure, referring to FIG. 13 and FIG. 16, the power battery pack 100 further includes: a pressing plate seal washer 54, where the pressing plate seal washer 54 includes a first pressing plate seal segment 541 and a second pressing plate seal segment 542 sequentially connected along an axial direction. The first pressing plate seal segment 541 is disposed in the inner hole of the pressing plate 53 and threaded by the cable 51, and the second pressing plate seal segment 542 is disposed between one of the plurality of seal rings 52 that is closest to the pressing plate 53 and the pressing plate 53. For example, in the example in FIG. 16, the second pressing plate seal segment 542 is connected to the right end of the first pressing plate seal segment 541, the first pressing plate seal segment 541 stretches into the inner hole of the pressing plate 53, and the second pressing plate seal segment 542 is disposed between the pressing plate 53 and a seal ring 52 closest to the pressing plate 53. Therefore, the sealing performance of the cable leading-out slot 131 is further improved.

Specifically, one end of the first pressing plate seal segment 541 away from the second pressing plate seal segment 542 (for example, the left end in FIG. 16) is provided with a pressing plate convex rib 5411. After the first pressing plate seal segment 541 stretches into the inner hole of the pressing plate 53, the pressing plate convex rib 5411 is located on a side of the pressing plate 53 away from the plurality of seal rings 52. The pressing plate convex rib 5411 extends outward along the radial direction of the cable 51, and the pressing plate convex rib 5411 abuts against the outer surface of the pressing plate 53 (for example, the surface on the left side in FIG. 16). The pressing plate convex rib 5411 may be formed into an annular convex rib, but is not limited thereto. Therefore, the first pressing plate seal segment 541 may be prevented from sliding out from the inner hole of the pressing plate 53, so that the location of the pressing plate seal washer 54 is stable, thereby ensuring the seal effect of the cable leading-out slot 131.

In some embodiments of the present disclosure, the pressing plate seal washer 54 is an integrally formed member, thereby simplifying the manufacturing process, and reducing the manufacturing costs.

According to some embodiments of the present disclosure, the power battery pack 100 further includes: a leading-out slot seal washer 55, where the leading-out slot seal washer 55 includes a first leading-out slot seal segment 551 and a second leading-out slot seal segment 552 sequentially connected along the axial direction. The first leading-out slot seal segment 551 is disposed in the inner hole of the cable leading-out slot 131 and threaded by the cable 51, and the second leading-out slot seal segment 552 is disposed between one that is of the plurality of seal rings 52 and that is farthest away from the pressing plate 53 and the inner wall of the cable leading-out slot 131. For example, in the example in FIG. 16, the leading-out slot seal washer 55 is disposed at one end of the cable leading-out slot 131 away from the pressing plate 53 (for example, the right end in FIG. 16), where the first leading-out slot seal segment 551 is connected to the right end of the second leading-out slot seal segment 552, the first leading-out slot seal segment 551 is disposed in the inner hole of the cable leading-out slot 131 and threaded by the cable 51, the cable leading-out slot 131 has a step-shaped inner wall at the right end of the cable leading-out slot, and the second leading-out slot seal segment 552 is disposed between a seal ring 52 farthest away from the pressing plate 53 and the step-shaped inner wall of the cable leading-out slot 131. Therefore, the sealing performance of the cable leading-out slot 131 is further improved.

Specifically, one end of the first leading-out slot seal segment 551 away from the second leading-out slot seal segment 552 (for example, the right end in FIG. 16) is provided with a leading-out slot convex rib 5511, and the leading-out slot convex rib 5511 is located on a side of the cable leading-out slot 131 away from the pressing plate 53. The leading-out slot convex rib 5511 may extend outward along the radial direction of the cable 51, and the leading-out slot convex rib 5511 abuts against a right side surface of the partition plate 13. The leading-out slot convex rib 5511 may be formed into an annular convex rib, but is not limited thereto. Therefore, the first leading-out slot seal segment 551 may be prevented from sliding out from the cable leading-out slot 131, so that the location of the leading-out slot seal washer 55 is stable, thereby ensuring the seal effect of the cable leading-out slot 131.

In some embodiments of the present disclosure, the leading-out slot seal washer 55 is an integrally formed member, thereby simplifying the manufacturing process, and reducing the manufacturing costs.

Further, a base plate 56 is disposed between the leading-out slot seal washer 55 and the cable leading-out slot 131. Therefore, the sealing performance of the cable leading-out slot 131 is further improved.

In some embodiments of the present disclosure, the base plate 56 is an aluminum alloy member, but is not limited thereto.

According to some embodiments of the present disclosure, the pressing plate 53 is in threaded connection to the battery pack case 1. Specifically, the pressing plate 53 may be provided with a screw hole, a thread fixing member 57 (for example, a screw) may pass through the screw hole and is connected to the battery pack case 1, so as to connect the pressing plate 53 to the battery pack case 1, the structure is simple, dismounting and mounting are convenient, and reliability is high. For example, in the example in FIG. 12, the pressing plate 53 is connected to the battery pack case 1 by using three thread fixing members 57.

Figure 17:
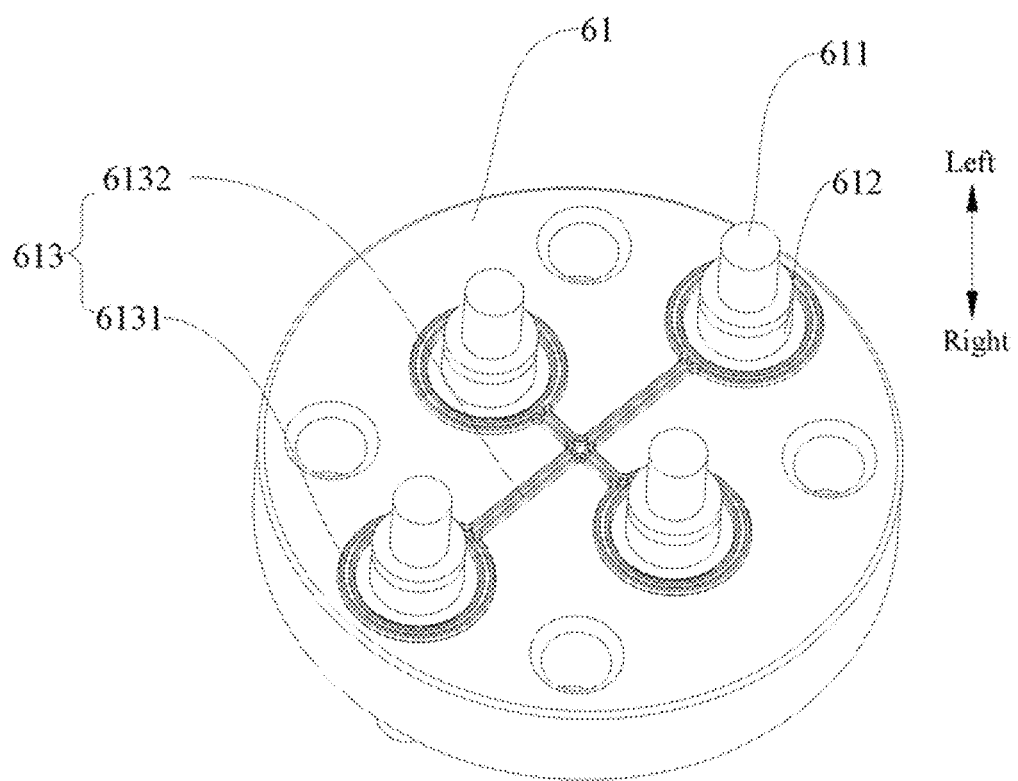
FIG. 17 is a three-dimensional view of a conductive post mounting body of a power battery pack according to an embodiment of the present disclosure.
Figure 18:
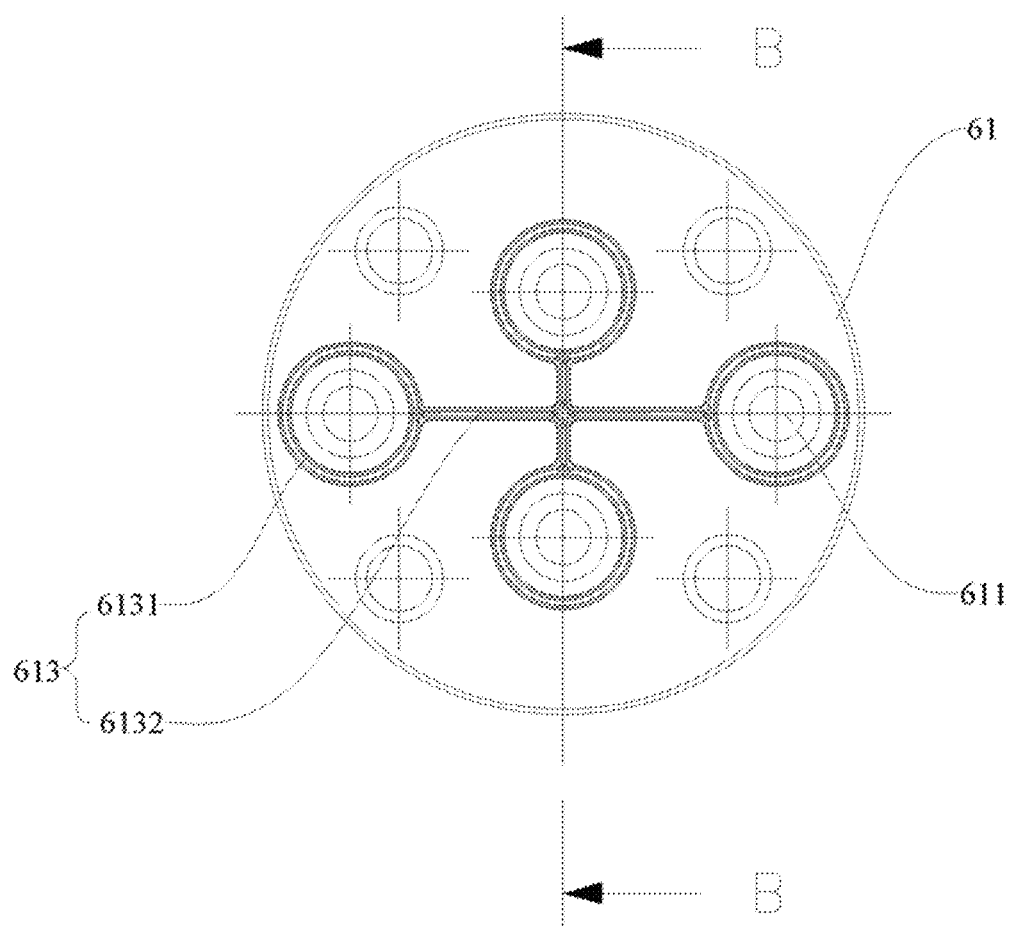
FIG. 18 is a front view of a conductive post mounting body of a power battery pack according to an embodiment of the present disclosure.
Figure 19:
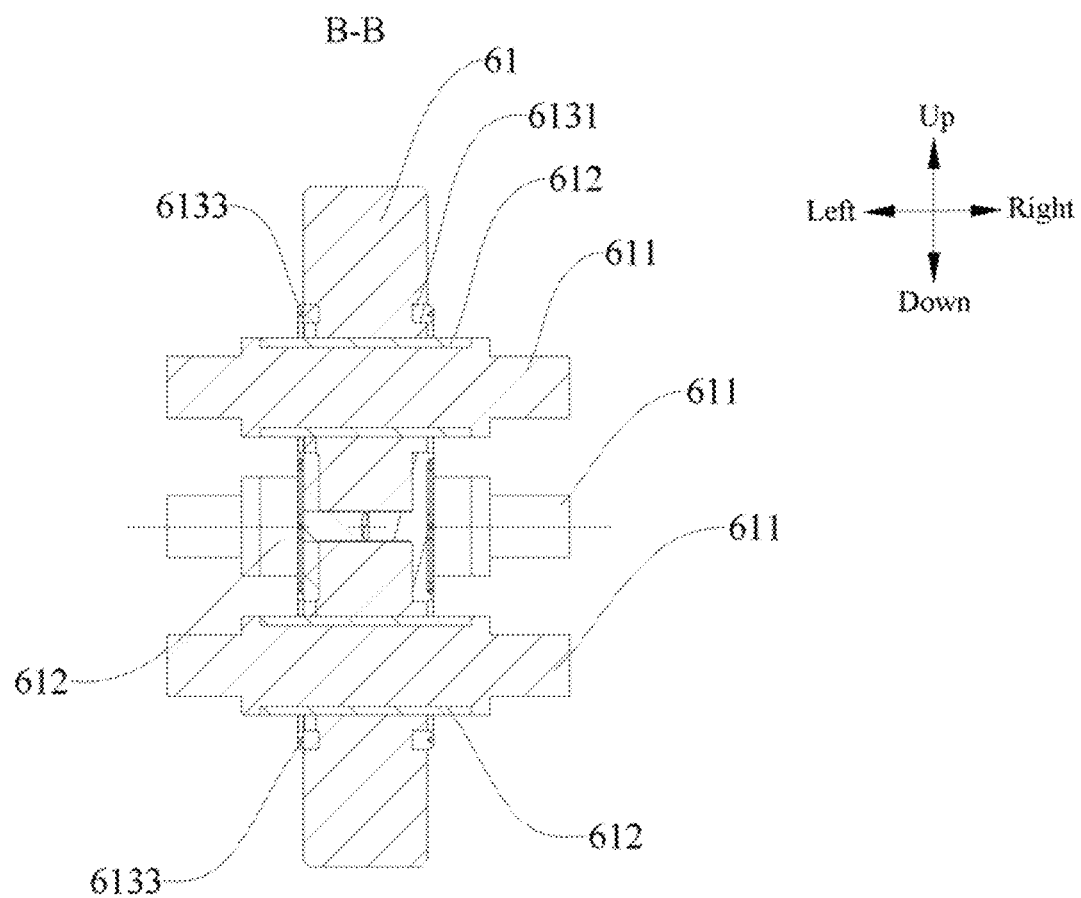
FIG. 19 is a sectional view along a line B-B in FIG. 18.

According to some embodiments of the present disclosure, referring to FIG. 2 and FIG. 3 and with reference to FIG. 17 to FIG. 19, the power battery pack 100 further includes a conductive post mounting body 61 and a pressing member 62. A mounting slot having a side (for example, the left side in FIG. 2) opened is formed on the battery pack case 1. Specifically, the mounting slot may be formed on the partition plate 13, and the mounting slot is located at one end of the partition plate 13 away from the cable leading-out slot 131 (for example, the front end in FIG. 2). The conductive post mounting body 61 is threaded by a plurality of conductive posts 611 spaced apart, and an insulation member 612 is disposed on an outer circumferential surface of each conductive post 611. Each of two sides of the conductive post mounting body 61 along the axial direction of the conductive post 611 is provided with a seal member 613, and the seal member 613 is disposed around the conductive post 611. The pressing member 62 is disposed on the foregoing one side of the mounting slot and tightly presses the conductive post mounting body 61 in the mounting slot. In some embodiments of the present disclosure, the conductive post 611 may be a red copper bar or the like. The red copper bar has good conductivity and is not easy to rust.

Specifically, referring to FIG. 17 to FIG. 19, the conductive post mounting body 61 may be formed into a circular flat plate structure, the conductive post mounting body 61 is provided with a plurality of conductive post leading-out holes, and the plurality of conductive post leading-out holes may be evenly distributed on the conductive post mounting body 61. The conductive post leading-out hole may be formed into a circular through hole, and the conductive post 611 passes through the conductive post leading-out hole and extends beyond the mounting slot. The insulation member 612 may wrap the outer circumferential surface of the conductive post 611, the insulation member 612 may be disposed in the middle of the conductive post 611, and each of two ends of the insulation member 612 (for example, the left end and the right end in FIG. 19) extends beyond the mounting slot. To be specific, two axial ends of the insulation member 612 respectively extend beyond corresponding surfaces of the conductive post mounting body 61. Therefore, power of the power battery pack 100 may be conveniently led out, and the insulation performance of the conductive post 611 is improved, thereby improving safety of the power battery pack 100 and adapting to large current output of the conductive post 611.

Herein, it should be noted that, "middle" mentioned in this application means middle in a broad sense. The middle of the conductive post 611 is a location between two axial ends of the conductive post 611.

Each of two axial ends of each conductive post 611 is provided with a seal member 613, the seal member 613 may be annular, and the seal member 613 is disposed around the conductive post 611. For example, the seal member 613 is disposed around the conductive post leading-out hole. The pressing member 62 is disposed on the foregoing one side of the mounting slot (that is, the left side) and tightly presses the conductive post mounting body 61 in the mounting slot, and effective seal is implemented through pressing between the pressing member 62 and the conductive post mounting body 61. Therefore, the sealing performance of the conductive post mounting body 61 may be effectively improved, to prevent the insulation oil in the battery pack case 1 from leaking from the conductive post mounting body 61.

According to some embodiments of the present disclosure, the seal member 613 includes a plurality of third seal rings 6131, and each third seal ring 6131 surrounds a conductive post 611. Therefore, the sealing performance of the conductive post leading-out hole may be ensured and the material of the seal member 613 may be effectively reduced, to reduce the material costs.

In some embodiments of the present disclosure, the third seal ring 6131 may be a rubber ring or the like, but is not limited thereto.

Further, the seal member 613 further includes a connection rib 6132, and the connection rib 6132 is connected among the plurality of third seal rings 6131. Therefore, the plurality of third seal rings 6131 may be connected as a whole by using the connection rib 6132. In the mounting process, the entire seal member 613 may be directly mounted onto the conductive post mounting body 61, thereby simplifying the mounting process, and improving the mounting efficiency.

Specifically, an accommodation slot used to accommodate the seal member 613 is formed on each of two side surfaces of the conductive post mounting body 61 along the axial direction of the conductive post 611. Therefore, it is convenient to mount the seal member 613 onto the conductive post mounting body 61, and the location of the seal member 613 is made stable, thereby improving the mounting efficiency and the seal effect of the seal member 613.

Further, the third seal ring 6131 includes a plurality of seal ribs 6133 that surrounds the conductive post 611 and that is spaced apart in the radial direction of the conductive post 611 (for example, the up and down direction in FIG. 19). For example, referring to FIG. 19, the third seal ring 6131 includes two seal ribs 6133, and the two seal ribs 6133 respectively surround the conductive post 611 and are spaced apart in the radial direction of the conductive post 611. Therefore, the seal effect of the third seal ring 6131 may be effectively improved by using the seal ribs 6133, the structure is simple, and the manufacturing is convenient.

In some embodiments of the present disclosure, the seal member 613 is an integrally formed member. Therefore, the manufacturing process is simplified, and the manufacturing costs are reduced.

In some embodiments of the present disclosure, the conductive post 611 is connected to the insulation member 612 through sintering and curing. Therefore, the insulation member 612 may bear a copper bar locking torque, to implement insulation and seal of the conductive post leading-out hole, the process is simple, and the manufacturing costs are low.

In some embodiments of the present disclosure, the conductive post mounting body 61 is an aluminum alloy member, but is not limited thereto.

According to some embodiments of the present disclosure, the insulation member 612 is a glass member or a ceramic member. For example, the conductive post 611 may be connected to the glass member or the ceramic member through sintering and curing. The glass member and the ceramic member have low material costs and good insulation performance, thereby effectively reducing the material costs of the insulation member 612 and improving the insulation performance of the conductive post 611.

According to some embodiments of the present disclosure, the quantity of conductive posts 611 may be four, but is not limited thereto. The four conductive posts 611 may include two positive electrode terminals and two negative electrode terminals. Therefore, the voltage of the conductive post 611 may be effectively reduced, thereby improving safety of the power battery pack.

Certainly, it may be understood that, the quantity of conductive posts 611 may further be two, six, or the like. This is not specifically limited in the present disclosure.

The power battery pack 100 according to this embodiment of the present disclosure has good heat dissipation performance, and power of the power battery pack 100 may be conveniently led out. Moreover, the power battery pack 100 has good insulation and sealing performance and high safety.

In the descriptions of this specification, descriptions such as reference terms "an embodiment", "some embodiments", "exemplary embodiment", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily refer to a same embodiment or example. In addition, the described specific feature, structure, material, or characteristic may be combined in a proper manner in any one or more embodiments or examples.

Although the embodiments of the present disclosure have been shown and described, a person skilled in the art can understand that the above embodiments cannot be construed to limit the present disclosure, and changes, alternatives, and modifications can be made in the embodiments without departing from the principle and the purpose of the present disclosure.

What is claimed is:

1. A power battery pack, comprising:
a battery pack case, wherein an oil inlet and an oil outlet are formed on the battery pack case, and insulation oil is charged from the oil inlet into the battery pack case;
at least one battery module disposed in the battery pack case, wherein the at least one battery module comprises a module case and at least one unit cell disposed in the module case, the at least one unit cell is immersed in the insulation oil, the bottom of the module case has a through hole, and the top of the module case has at least one exhaust vent; and
a return pipe disposed outside the battery pack case, wherein the return pipe is a transparent pipe or a translucent pipe and is connected between the oil outlet and the oil inlet.

2. The power battery pack according to claim 1, wherein the oil inlet is disposed adjacent to a bottom wall of the battery pack case, and the oil outlet is disposed on the top of the battery pack case.

3. The power battery pack according to claim 1, further comprising an oil return passage formed between the return pipe and the battery pack case through the oil inlet and the oil outlet, and an oil pump is disposed on the oil return passage.

4. The power battery pack according to claim 1, further comprising a separator disposed in the battery pack case, wherein the separator separates the inner part of the battery pack case into a first accommodation space and a second accommodation space, and the at least one battery module disposed in the second accommodation space.

5. The power battery pack according to claim 4, further comprising a sealing plate disposed on the battery pack case, wherein the sealing plate comprises a first sealing plate and a second sealing plate, the first sealing plate is used to seal the first accommodation space, and the second sealing plate is used to seal the second accommodation space.

6. The power battery pack according to claim 5, wherein the top of the second sealing plate has at least one fixing member, wherein a return pipe fixing hole is formed on the at least one fixing member, and the return pipe passes through the return pipe fixing hole and is fixed on the second sealing plate.

7. The power battery pack according to claim 1, further comprising a liquid cooling device disposed in the battery pack case, wherein the liquid cooling device is located on the bottom of the at least one battery module.

8. The power battery pack according to claim 7, wherein the oil inlet is disposed adjacent to the liquid cooling device.

9. The power battery pack according to claim 7, wherein the liquid cooling device comprises a first main pipe, a second main pipe, and a plurality of liquid cooling members, both the first main pipe and the second main pipe extend along a first direction, the first main pipe has a liquid inlet and the second main pipe has a liquid outlet, the plurality of liquid cooling members are connected in parallel between the first main pipe and the second main pipe, and the plurality of liquid cooling members are used to cool the at least one battery module.

10. The power battery pack according to claim 9, wherein the first main pipe and the second main pipe are arranged side by side and are both located on a same side of the at least one battery module along a second direction perpendicular to the first direction.

11. The power battery pack according to claim 9, wherein a first end of each liquid cooling member and the first main pipe are connected by using a first adaptor pipe, and a second end of each liquid cooling member and the second main pipe are connected by using a second adaptor pipe.

12. The power battery pack according to claim 11, wherein the first adaptor pipe and the second adaptor pipe are bent pipes arranged along an up and down direction.

13. The power battery pack according to claim 9, wherein each liquid cooling member comprises a flat pipe extended from the bending.

14. The power battery pack according to claim 13, wherein each liquid cooling member further comprises a liquid cooling plate disposed on a side surface of the flat pipe adjacent to the at least one battery module.

* * * * *